Feb. 13, 1973  S. B. DUNLAP ET AL  3,715,986
TORQUE CLUTCH FOR MILITARY FUZES
Filed Jan. 27, 1970
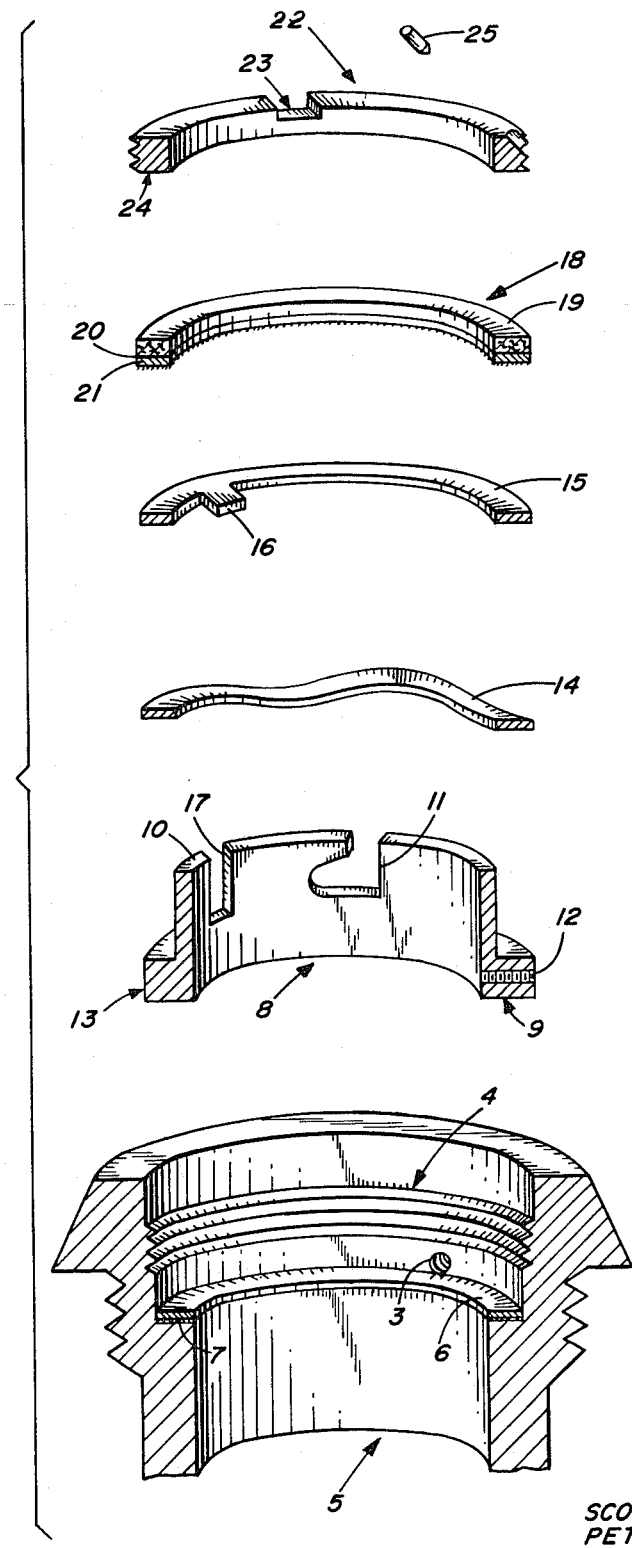
INVENTORS
SCOTT B. DUNLAP
PETER R. OSTERLING
BY CHARLES W. TEPPER
Thomas O. Watson Jr.
ATTORNEY

United States Patent Office 3,715,986
Patented Feb. 13, 1973

3,715,986
TORQUE CLUTCH FOR MILITARY FUZES
Scott B. Dunlap, Peter R. Osterling, and Charles W. Tepper, Rochester, N.Y., assignors to the United States of America as represented by the Secretary of the Navy
Filed Jan. 27, 1970, Ser. No. 10,109
Int. Cl. F42c 9/00
U.S. Cl. 102—71
10 Claims

ABSTRACT OF THE DISCLOSURE

A torque clutch for time settable fuzes in which assembly friction is generated at two interfaces between asbestos fiber pads and a smooth metal surface. Axial pressure at these interfaces is provided by a spring washer and is adjusted by a threaded ring. The threaded adjusting ring is pinned to the nonrotating fuze member and the lower asbestos friction pad is bonded to the nonrotating fuze member to assure that these three parts do not move with respect to each other.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention pertains to time settable fuzes such as controlled variable time fuzes, electronic time fuzes and mechanical time fuzes and more particularly to torque clutches used in time fuzes. The torque clutches used in the time fuzes of the prior art leave room for improvement in the area of stability of the fuze's time setting when the fuze is undergoing handling shock, extended storage, or variable climates.

SUMMARY OF THE INVENTION

The torque clutch of the present invention provides a more stable time settable fuze than was heretofore possible by providing two clutch interfaces designed so as to facilitate adjustment of the surface friction generated at the respective faces. Adjustment of the surface friction is accomplished by means of a wave spring washer which provides the axial pressure required when a threaded ring which bears on the wave spring washer is adjusted to compress the wave spring washer.

OBJECTS OF THE INVENTION

An object of this invention is to provide an improved torque clutch for time settable fuzes.

Another object of this invention is to provide an improved torque clutch which will be more reliable while undergoing handling shock, extended storage, or a variable climate.

Other objects, advantages and novel features of the invention will become apparent from the following detailed description of the invention when considered in conjunction with the accompanying drawings.

BRIEF DESCRIPTION OF THE DRAWING

The figure is a blow-up of the torque clutch of the invention.

DESCRIPTION OF THE PREFERRED EMBODIMENT

Referring to the figure, nonrotating fuze member 5 is that segment of a complete fuze assembly that threadably attaches to the projectile which is to be detonated by the fuze. As can be seen from the drawing nonrotating fuze member 5 is hollow and accommodates the other parts of the torque clutch of the instant invention by housing them within its confines.

Nonrotating fuze member 5 has an internal shoulder 7 upon which is bonded a friction pad 6 made out of asbestos fibers and a plastic binder material. A pad material that may be used in this application is Raybestos Manhatten R–471 which is commercially available and well known in the art. The inner wall of the nonrotating fuze member also has internal threads 4 which accommodate the external threads of threaded ring 22.

Clutch sleeve 8 fits into the recess of nonrotating fuze member 5 and its external flange 13 by means of its smooth metal face 9 rests against the pad covered internal shoulder 7 of the nonrotating fuze member, thus forming one clutch interface. Clutch sleeve 8 has cut into its wall a slot 17 which is for accommodating tab 16 of flat metal washer 15 and a cam shaped opening 11 which is for engaging lugs in a fuze rotating member which is not illustrated since the ordinary mechanics of time settable fuzes are well known in the art.

The fuze rotating member of a time settable fuze sits upon the top face 10 of the clutch sleeve. The lugs of the fuze rotating member, which are not shown, engage the cam shaped openings cut into the side of the clutch sleeve. The fuze rotating member is further secured to the clutch sleeve by means of set screws 12 which are threaded into the external flange 13 and bear against the fuze rotating member upon tightening. Access hole 3 in the nonrotating fuze member 5 is for gaining access to these set screws when the clutch for the mechanical time fuze is assembled. It would be normal practice not to attach the fuze rotating member to the nonrotating portion of the mechanical time fuze until the clutch is completely assembled.

Continuing with the description of the clutch assembly, external flange 13 of clutch sleeve 8 by means of smooth metal face 9 abuts fiber friction pad 6 which is bonded to the internal shoulder 7 of the nonrotating fuze member 5.

Wave spring washer 14 fits around clutch sleeve 8 and rests upon external flange 13. The wave spring washer is designed so its deflection to force ratio is as high as possible over the force range in which it must operate and so it will not be overstressed when it is completely flattened.

A flat metal washer 15 with a tab 16 rests upon the wave spring washer 14 and has its tab 16 inserted into slot 17 of clutch sleeve 8 so as to nonrotatably engage clutch sleeve 8.

A friction washer 18 rests upon flat metal washer 15. This friction washer is composed of two materials that are bonded together at joint 20. The top face 19 of friction washer 18 is a material made up of asbestos-fibers and a plastic binder. Such a material is Raybestos Manhatten R–471. This face engages the bottom face 24 of threaded ring 22 which is smooth metal such as stainless steel. The bottom face 21 of the friction washer 18 is an abrasive coated cloth with the abrasive side down so that the abrasive side engages flat washer 15. The two dissimilar materials in friction washer 18 are bonded together by conventional bonding material which is well known in the art.

Threaded ring 22 rests upon friction washer 18 and threadably engages the internal threads 4 of nonrotating fuze member 5. When a compressional force is applied by turning ring 22, wave spring washer 14 is deflected. Wrench slot 23 facilitates the tightening of the assembly. By means of spring washer 14 a uniformly distributed axial pressure is supplied to the two clutch interfaces. Locking pin 25 is utilized when the desired amount of axial pressure is developed at the clutch interfaces to lock the threaded ring so that it will be nonrotatably engaged with nonrotating fuze member 5.

One clutch interface occurs between face 9 of external flange 13 and friction pad 6 of internal shoulder 7, and the other occurs between the upper face 19 of frictional washer 18 and the bottom face 24 of threaded ring 22. The upper face 19 of friction washer 18 and the bottom face 24 of threaded ring 22 rotate upon adjustment of the fuze rotating member. These interfaces provide stable operation during handling shock, long periods of storage, and a variety of climates and humidities.

To provide optimum operation of the torque clutch assembly when Raybestos Manhatten R-471 material is used, friction washer 18, prior to assembly of the torque clutch, could be conditioned by heating and compressing it between two flat parallel surfaces at a force of three tons and a temperature of 185° F. Lower asbestos fiber friction pad 6, prior to assembly, could also be conditioned by compressing and heating. This treatment would not be necessary if friction pad material suitably compressed was obtained from the manufacturer.

After assembly of the lower friction pad 6 it may be conditioned by applying a force of about one ton at a temperature above the maximum working temperature of 160° F.

The conditioning of the friction pads at temperatures above that normally encountered during operation of the fuze and pressures exceeding one tenth that experienced at set back will result in the desired performance of the torque clutch in the many environments of its operation.

Obviously many modifications and variations of the present invention are possible in the light of the above teachings.

What is claimed is:

1. A torque clutch for use in time settable fuzes comprising:
    a nonrotating fuze member having internal threads and an internal shoulder with a friction pad bonded thereto;
    a clutch sleeve having a means for securably engaging a rotating fuze member and having an external flange at one end which fits inside said fuze member to engage said friction pad;
    a wave spring washer that fits around said clutch sleeve to abut the top face of the flange;
    a flat metal washer that fits around said clutch sleeve and abuts said spring washer;
    a friction washer of friction material that fits around said clutch sleeve to engage said flat metal washer; and
    a threaded ring that fits around said clutch sleeve to engage said friction washer by its bottom face and also compresses said wave spring washer, said threaded ring having a bottom face of smooth metal and a top face having a wrench slot and a locking pin, said wrench slot facilitating threadable movement of said threaded ring and said locking pin facilitating the locking of said threaded ring into position after said wave spring washer is compressed.

2. The torque clutch recited in claim 1 wherein the clutch sleeve means for securably engaging to a rotating fuze member comprises:
    a cam shaped opening in the wall of said clutch sleeve for engaging lugs of the rotating fuze member; and
    setscrews threaded into the external flange of said clutch sleeve so as to bear against the rotating fuze member.

3. The torque clutch recited in claim 1 wherein said clutch sleeve has a slot in its wall and said flat metal washer has a key tab on its inner circumference for insertable engagement with the slot.

4. The torque clutch recited in claim 1 wherein said friction washer comprises:
    a fiber friction washer; and
    an abrasive coated cloth washer bonded to said fiber friction washer so that the abrasive side of said cloth washer contacts said flat metal washer, whereby said fiber friction washer contacts said threaded ring.

5. The torque clutch recited in claim 4 wherein said fiber friction washer comprises an asbestos fiber friction pad material with a plastic binder.

6. The torque clutch recited in claim 5 wherein said friction washer is conditioned prior to assembly by compressing between two flat, parallel surfaces at a force exceeding $\frac{1}{10}$ the force experienced at set back and at a temperature exceeding normal maximum operating temperature.

7. The torque clutch recited in claim 1 wherein said wave spring washer has a large deflection-to-force ratio over the operating force range of the clutch and is not overstressed when it is completely flattened.

8. The torque clutch recited in claim 1 wherein the friction pad bonded to the internal shoulder of said nonrotating fuze member is made of asbestos fiber material with a plastic binder, said friction pad being conditioned by compression between two flat, parallel surfaces at a force $\frac{1}{10}$ the force experienced at set back and at a temperature exceeding normal maximum operating temperature prior to assembly of the friction pad and at a force of about one ton after said assembly.

9. The torque clutch recited in claim 1 wherein the bottom face of the external flange of said clutch sleeve is smooth metal.

10. A torque clutch for use in time settable fuzes comprising:
    a nonrotating fuze member having internal threads and an internal shoulder with a friction pad bonded thereto;
    a clutch sleeve having a means for securably engaging a rotating fuze member and having an external flange at one end which fits inside said fuze member to engage said friction pad, said clutch sleeve having a cam shaped opening in its wall for engaging lugs of the rotating fuze member and setscrews threaded into the external flange so as to bear against the rotating fuze member;
    a wave spring washer that fits around said clutch sleeve to abut the top face of the flange;
    a flat metal washer that fits around said clutch sleeve and abuts said spring washer;
    a friction washer of friction material that fits around said clutch sleeve to engage said flat metal washer; and
    a threaded ring that fits around said clutch sleeve to engage said friction washer by its bottom face and also compresses said wave spring washer.

References Cited
UNITED STATES PATENTS

| | | | |
|---|---|---|---|
| 2,911,915 | 11/1959 | Gibbs et al. | 102—71 |
| 2,580,869 | 1/1952 | Winther | 192—107 M |
| 2,134,744 | 11/1938 | Wales | 192—107 M |

SAMUEL W. ENGLE, Primary Examiner

U.S. Cl. X.R.

102—82; 192—65